(12) United States Patent
Hsiao

(10) Patent No.: US 11,573,287 B2
(45) Date of Patent: Feb. 7, 2023

(54) RADAR AND METHOD OF UPDATING BACKGROUND COMPONENTS OF ECHO SIGNAL OF RADAR

(71) Applicant: RichWave Technology Corp., Taipei (TW)

(72) Inventor: Chun-Hsien Hsiao, Taipei (TW)

(73) Assignee: RichWave Technology Corp., Taipei (TW)

( * ) Notice: Subject to any disclaimer, the term of this patent is extended or adjusted under 35 U.S.C. 154(b) by 113 days.

(21) Appl. No.: 17/028,977

(22) Filed: Sep. 22, 2020

(65) Prior Publication Data

US 2021/0141052 A1    May 13, 2021

(30) Foreign Application Priority Data

Nov. 8, 2019  (TW) ................... 108140637

(51) Int. Cl.
*G01S 7/02*    (2006.01)
*G01S 7/35*    (2006.01)
*G01S 7/52*    (2006.01)

(52) U.S. Cl.
CPC .............. *G01S 7/023* (2013.01); *G01S 7/354* (2013.01); *G01S 7/356* (2021.05); *G01S 7/52077* (2013.01)

(58) Field of Classification Search
CPC .......... G01S 7/023; G01S 7/354; G01S 7/356; G01S 7/2883; G01S 7/52046; G01S 7/487; G01S 7/4876; G01S 7/52077; G01S 13/89

USPC ......................................................... 342/192
See application file for complete search history.

(56) References Cited

U.S. PATENT DOCUMENTS

| | | | | | |
|---|---|---|---|---|---|
| 4,450,446 | A | * | 5/1984 | Clancy | G01S 13/5244 342/159 |
| 5,539,412 | A | * | 7/1996 | Mendelson | G01R 23/16 324/76.19 |
| 6,011,507 | A | * | 1/2000 | Curran | G01S 13/931 342/70 |
| 6,104,336 | A | * | 8/2000 | Curran | G01S 13/48 342/70 |
| 6,366,236 | B1 | * | 4/2002 | Farmer | G01S 13/34 342/195 |
| 6,772,100 | B2 | * | 8/2004 | Lipp | G01S 13/723 702/194 |
| 6,809,681 | B1 | * | 10/2004 | Niechayev | G01S 13/582 342/159 |

(Continued)

FOREIGN PATENT DOCUMENTS

CN   104903742 A   9/2015
CN   105793728 A   7/2016

(Continued)

*Primary Examiner* — Erin F Heard
*Assistant Examiner* — Michael W Justice
(74) *Attorney, Agent, or Firm* — Winston Hsu

(57) ABSTRACT

A method of updating background components of an echo signal for radar includes: transforming M sets of N pieces of time domain data to frequency domain to generate M sets of P magnitudes corresponding to P frequency bins, wherein the M sets of N pieces of time domain data include spatial information of an object; and updating P background components corresponding to the P frequency bins according to the M sets of P magnitudes corresponding to the P frequency bins.

14 Claims, 9 Drawing Sheets

(56) References Cited

U.S. PATENT DOCUMENTS

| | | | | |
|---|---|---|---|---|
| 6,822,606 B2* | 11/2004 | Ponsford | ............... | G01S 7/2921 342/159 |
| 7,187,320 B1* | 3/2007 | Yang | ..................... | G01S 13/723 342/75 |
| 7,477,181 B2* | 1/2009 | Banaszak | ............. | G01S 13/931 342/93 |
| 7,808,423 B2* | 10/2010 | Winstead | ................ | G01S 7/285 342/134 |
| 8,619,241 B2* | 12/2013 | Mimeault | ............. | G01S 7/4865 356/3.01 |
| 8,797,206 B2* | 8/2014 | Uysal | ................. | G01S 13/9029 342/25 B |
| 8,803,730 B2* | 8/2014 | Jiang | ....................... | G01S 7/021 375/349 |
| 9,151,827 B2* | 10/2015 | Jaeger | ................... | G01S 7/4004 |
| 10,145,950 B2* | 12/2018 | Allistair | ................. | G01S 7/415 |
| 10,201,278 B2* | 2/2019 | Lux | ......................... | A61B 5/024 |
| 10,482,582 B2* | 11/2019 | Courtney | ............ | A61B 8/5207 |
| 10,929,653 B2* | 2/2021 | Yan | ....................... | G06V 40/103 |
| 11,035,937 B2* | 6/2021 | Gidel | ...................... | G01C 3/08 |
| 11,119,186 B2* | 9/2021 | Roh | ......................... | G01S 13/42 |
| 11,131,766 B2* | 9/2021 | Yan | ....................... | G01S 13/505 |
| 2003/0115007 A1* | 6/2003 | Lipp | ......................... | G01S 13/42 702/94 |
| 2004/0178951 A1* | 9/2004 | Ponsford | ................ | G01S 7/292 342/194 |
| 2007/0194976 A1* | 8/2007 | Reed | ....................... | G01S 7/411 342/188 |
| 2008/0191930 A1* | 8/2008 | Banaszak | ............. | G01S 13/931 342/93 |
| 2009/0184867 A1* | 7/2009 | Lee | ..................... | H04W 64/006 707/E17.014 |
| 2010/0277713 A1* | 11/2010 | Mimeault | ............... | G01S 7/487 356/5.01 |
| 2013/0021197 A1* | 1/2013 | Jiang | ...................... | G01S 7/021 342/195 |
| 2014/0159943 A1* | 6/2014 | Jaeger | .................. | G01S 13/343 342/90 |
| 2014/0191900 A1* | 7/2014 | Uysal | .................. | G01S 13/9023 342/25 A |
| 2014/0316261 A1* | 10/2014 | Lux | .......................... | G01S 13/88 600/407 |
| 2016/0025845 A1* | 1/2016 | Allistair | .................. | G01S 7/354 342/128 |
| 2016/0054432 A1* | 2/2016 | Lilburn | ................. | G01S 7/2806 342/195 |
| 2018/0253830 A1* | 9/2018 | Courtney | ............. | A61B 8/5269 |
| 2019/0011543 A1* | 1/2019 | Gidel | ...................... | G01S 7/497 |
| 2019/0041494 A1* | 2/2019 | Roger | ..................... | G01S 13/87 |
| 2019/0178985 A1* | 6/2019 | Roh | ........................ | G01S 7/2923 |
| 2019/0310362 A1* | 10/2019 | Yan | ........................ | G01S 7/415 |
| 2019/0318162 A1* | 10/2019 | Yan | ........................ | G01S 13/58 |
| 2021/0405150 A1* | 12/2021 | Roh | ........................ | G01S 7/354 |

FOREIGN PATENT DOCUMENTS

| | | | | |
|---|---|---|---|---|
| TW | I588510 B | 6/2017 | | |
| WO | 2018138725 A1 | 8/2018 | | |
| WO | WO-2018138725 A1 * | 8/2018 | ........... | G01S 13/345 |

* cited by examiner

RADAR AND METHOD OF UPDATING BACKGROUND COMPONENTS OF ECHO SIGNAL OF RADAR

CROSS REFERENCE TO RELATED APPLICATION

This non-provisional application claims priority of Taiwan patent application No. 108140637, filed on 8 Nov. 2019, included herein by reference in its entirety.

TECHNICAL FIELD

The invention relates to a signal processing method, and specifically, to a radar and a method of updating background components of an echo signal of a radar.

BACKGROUND

Radar can compute the direction, location, and velocity of a target object by receiving a signal reflected from the target object, and therefore, the radar has found growing applications in the fields of military, industrial, automotive, automation and other applications. However, there is always background noise from the radio environment present in the reflected signal, degrading performance of the radar. The background noise may be different for different frequency bands, and may be affected by the radio environment to vary with time and space.

SUMMARY

According to one embodiment, a method of updating background components of an echo signal of a radar includes: transforming M sets of N pieces of time-domain data to a frequency domain to generate M sets of P magnitudes corresponding to P frequency bins, wherein the M sets of N pieces of time-domain data comprise spatial information of an object; and updating P background components corresponding to the P frequency bins according to the M sets of P magnitudes corresponding to the P frequency bins; wherein M, N and P are positive integers exceeding 1.

According to another embodiment, a radar includes an antenna and a controller coupled thereto. The antenna is used to receive an echo signal. The controller coupled to the antenna and configured to transform M sets of N pieces of time-domain data to frequency domain to generate M sets of P magnitudes corresponding to P frequency bins. The M sets of N pieces of time-domain data comprise spatial information of an object. M, N and P are positive integers exceeding 1.

DETAILED DESCRIPTION

Figure 1:
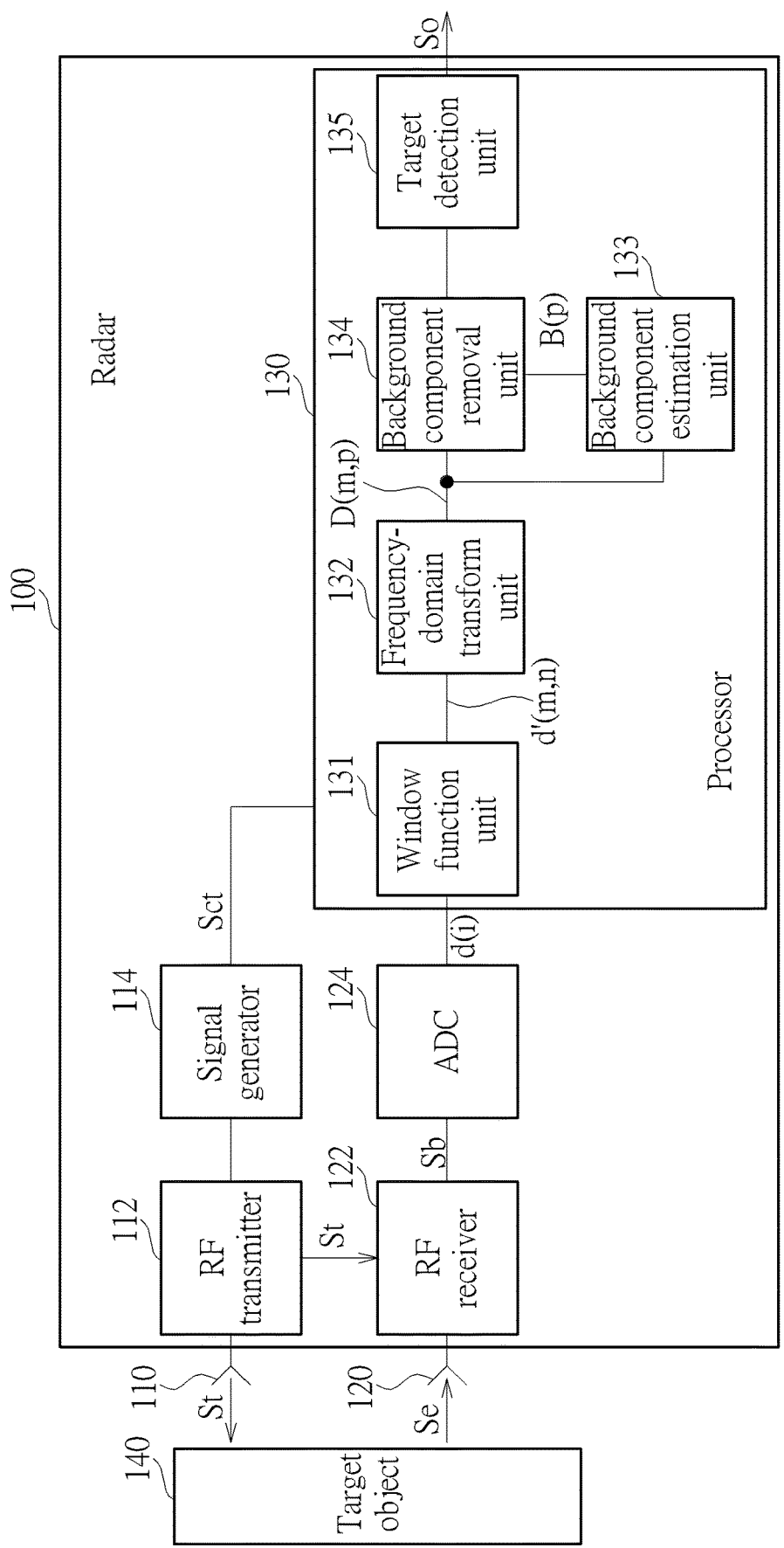
FIG. 1 is a block diagram of a radar according to an embodiment of the invention.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

FIG. 1 is a block diagram of a radar 100 according to an embodiment of the invention. The radar 100 may be a frequency-modulated continuous wave (FMCW) radar, and may transmit a transmission signal St, receive an echo signal Se reflected from a target object 140, and determine spatial information of the target object 140 according to the echo signal Se. The spatial information may be a distance between the target object 140 and the radar 100. Since background components in the radio environment may vary with the radio environment and interfere with the echo signal Se, e.g., a fluorescent tube may generate background components at 60 Hz and multiples thereof, the radar 100 may estimate a background component in each frequency bin in real time, and remove the background component in each frequency bin from the echo signal Se of the radar 100 to accurately estimate the spatial information of the target object 140.

The radar 100 may include antennas 110, 120, a radio frequency (RF) transmitter 112, a signal generator 114, an RF receiver 122, an analog to digital converter (ADC) 124 and a processor 130. The antenna 110, the RF transmitter 112, the signal generator 114 and the processor 130 are coupled in sequence. The antenna 120, the RF receiver 122, the ADC 124 and the processor 130 are coupled in sequence.

Figure 2:
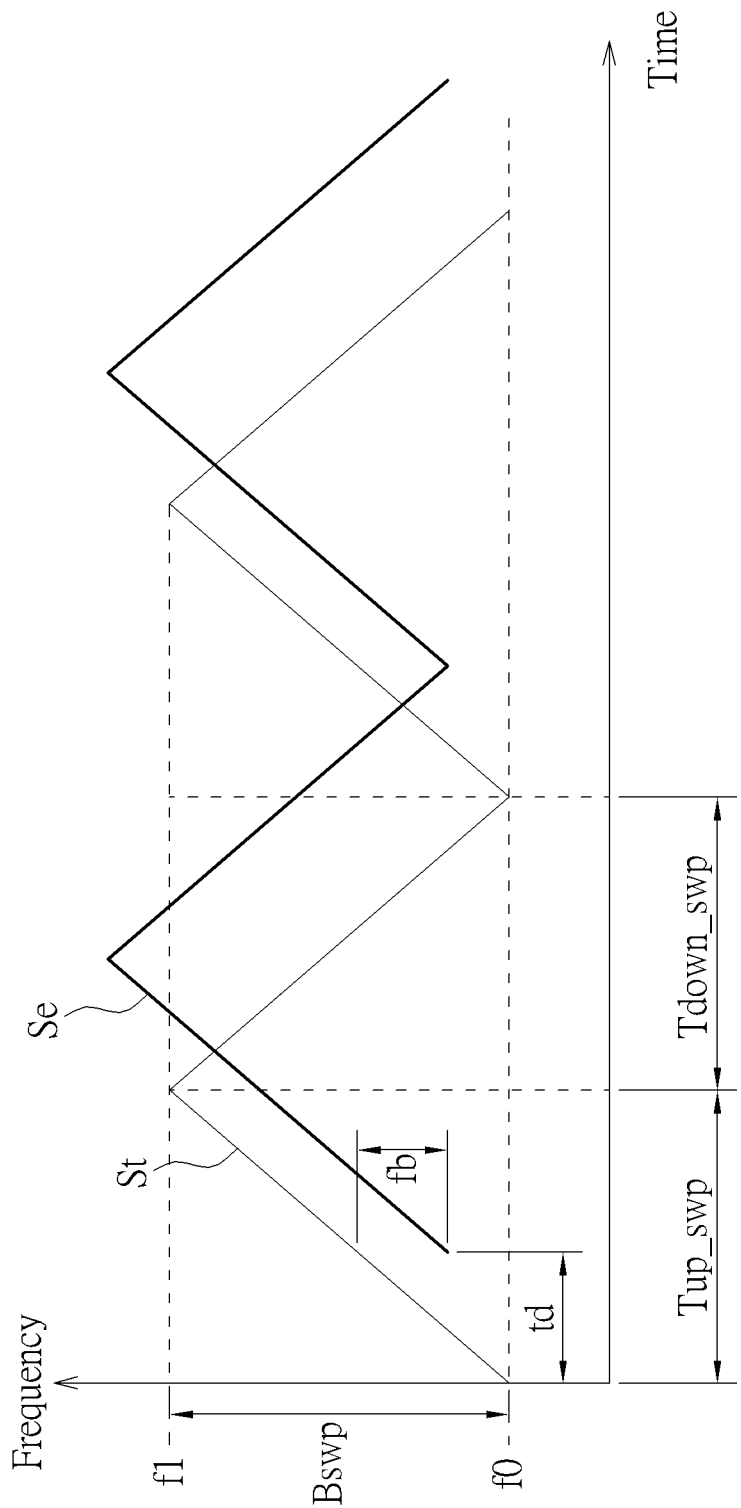
FIG. 2 is a time-frequency diagram of the transmission signal and the echo signal in FIG. 1.

The processor 130 may control the signal generator 114 by a control signal Sct to generate an FMCW baseband signal, the RF transmitter 112 may convert the FMCW baseband signal into the transmission signal St at a predetermined frequency bin (e.g., 77 GHz), and then the antenna 110 may transmit the transmission signal St. The FMCW waveform generated by the radar 100 may be in form of a triangular wave, a saw-toothed wave, a staircase wave, a sinusoidal wave or other waves. The RF receiver 122 may receive the echo signal Se via the antenna 120, and mix the echo signal Se and a signal associated with the transmission signal St, such as the transmission signal St to generate a beat signal Sb. The beat signal Sb may carry beat information indicative of one half of a frequency difference between the transmission signal St and the echo signal Se. FIG. 2 is a time-frequency diagram of the transmission signal St and the echo signal Se in FIG. 1, in which the horizontal axis represents time and the vertical axis represents frequency. The frequency of the transmission signal St may, but is not limited to, vary periodically in form of a triangular wave modulation. The transmission signal St modulated in the triangular wave may include an up-chirp segment and a down-chirp segment. During an up-chirp interval Tup_swp, the up-chirp segment of the transmission signal St may raise from a frequency f0 to a frequency f1 in a linear manner. A range between the frequency f0 to the frequency f1 may be referred to as a sweep bandwidth Bswp. During a down-chirp interval Tdown_swp, the down-chirp segment of the transmission signal St may decline from the frequency f1 to the frequency f0 in a linear manner. A length of the up-chirp interval Tup_swp may be substantially equal to that of the down-chirp interval Tdown_swp. The values of the frequency f0 and the frequency f1 may be adjusted by the processor 130 via the control signal Sct. The echo signal Se may have a wave shape substantially identical to that of the transmission signal St, but is shifted in time and frequency. The shift in frequency of the echo signal Se with respect to the transmission signal St is referred to as the beat frequency fb. The shift in time td may be used to compute a distance between the target object 140 and the radar 100 using a time-of-flight approach.

Referring to FIG. 1, the ADC 124 may sample the beat signal Sb at a predetermined sampling frequency, e.g., 44 kHz to generate M×N pieces of digital data d(i), wherein i, M and N are positive integers exceeding 1, e.g., M may be equal to 2, N may be equal to 64, and i may range between 1 and 128. The processor 130 may receive digital data d(1) to d(M×N), update and remove background components in a plurality of frequency bins, and generate an output signal So indicative of the spatial information of the target object 140.

The processor 130 may include a window function unit 131, a frequency-domain transform unit 132, a background component estimation unit 133, a background component removal unit 134 and a target detection unit 135. The window function unit 131 may be coupled between the ADC 124 and the frequency-domain transform unit 132. The frequency-domain transform unit 132 may be coupled to the background component estimation unit 133 and the background component removal unit 134. The background component removal unit 134 may be further coupled to the target detection unit 135. The window function unit 131, the frequency-domain transform unit 132, the background component estimation unit 133, the background component removal unit 134 and the target detection unit 135 may be implemented by software, hardware or a combination thereof.

The window function unit 131 may utilize a window function to divide the digital data d(1) to d(M×N) by a predetermined time interval, such as a fixed time interval to generate M intervals of N pieces of time-domain data d'(m,n), n being positive integers, 1≤m≤M 1≤n ≤N. The window function may be fixed in length, and may be a rectangular window function, a Hamming window function, a Hanning window function or other types of window functions. For example, the window function unit 131 may utilize a window function to divide the digital data d(1) to d(128) by a fixed length of 64 pieces of time-domain data to generate 2 sets of time-domain data, in which time-domain data d'(2,64) represents the 64th piece of time-domain data in the second time interval.

The frequency-domain transform unit 132 may perform a time-domain to frequency-domain transform on the time-domain data d' (1,1) to d'(M,N) to generate a frequency component D(m,p) corresponding to a pth frequency bin in an mth time interval, and output the frequency component D(m,p) to the background component estimation unit 133 and the background component removal unit 134, p being a positive integer, p≤P. For example, the time-domain data D(2,32) may represent the 32th frequency component in the second time interval. The time-domain to frequency-domain transform may be implemented by the short-time Fourier transform, the wavelet transform, the Hilbert-Huang Transform or a combination thereof. The frequency components may be complex numbers. In some embodiments, P=N, the frequency-domain transform unit 132 may output the frequency components D(1,1) to D(M,N) for subsequent usage. In other embodiments, since the frequency components D(1,1) to D(M,N) corresponding to N frequency bins in the mth time interval are conjugate symmetric, P=N/2, that is, the frequency components D(m,1) to D(m,N/2) and the frequency components D(m,N/2+1) to D(m,N) are conjugate symmetric, respectively, and the frequency-domain transform unit 132 may output a portion of the frequency components, e.g., the frequency components D(1,1) to D(1, N/2), . . . , D(M,1) to D(M,N/2) for subsequent usage, thereby saving signal processing resources considerably.

The background component estimation unit 133 may compute magnitudes of the frequency components D(1,1) to D(M,P) according to the P frequency components D(1,1) to D(M,P) in the M time intervals, e.g., by computing absolute values of the P frequency components D(1,1) to D(M,P), so as to generate the magnitudes |D(1,1)| to |D(M,P)|, and update a pth background component B(p) corresponding to the pth frequency bin in current M time intervals according to the magnitudes |D(1,p)| to |D(M,p)|. Specifically, the background component estimation unit 133 may compute a pth reference value of the M magnitudes |D(1,p)| to |D(M, p)| in the M time intervals corresponding to the pth frequency bin, and generate a pth adjustment value according to at least one of the pth reference value and a pth previous background component corresponding to the pth frequency bin, and update the pth background component B(p) according to the pth adjustment value. In some embodiments, the background component estimation unit 133 may set the pth adjustment value as the pth background component B(p). The pth previous background component may be the pth background component B(p) corresponding to the pth frequency bin in the previous M time intervals. The pth reference value may be a mean or other statistical measures of the M magnitudes |D(1,p)| to |D(M,p)|. In some embodiments, the background component estimation unit 133 may generate, according to the magnitudes |D(1,p)| to |D(M,p)|, a pth set of upper envelop data and a pth set of lower envelop data corresponding to the pth frequency bin, and compute a pth variance corresponding to the pth frequency bin according to differences between the pth set of upper envelope data and the pth set of lower envelope data. In some embodiments, the background component estimation unit 133 may compute a mean of the differences between the pth set of upper envelope data and the pth set of lower envelope data to generate the pth variance. In other embodiments, the background component estimation unit 133 may generate a statistical variance according to the magnitudes |D(1,p)| to |D(M,p)| to serve as the pth variance corresponding to the pth frequency bin. The background component estimation unit 133 may be operated in a reset mode, a fast mode, a slow mode or a frozen mode, and may compute a weighted sum of the pth reference value and the pth previous background component respectively using various reference coefficients and background coefficients to generate the pth adjustment value, as expressed by Equation (1):

$$C(p)=(1-\alpha)A(p)+\alpha B'(p) \quad \text{Equation (1)}$$

where C(p) is the pth adjustment value corresponding to the pth frequency bin;

A(p) is the pth reference value corresponding to the pth frequency bin;

B'(p) is the pth previous background component corresponding to the pth frequency bin;

(1-α) is the reference coefficient; and

α is the background coefficient.

The reference coefficient (1-α) and the background coefficient α may be added up to 1. The background component estimation unit 133 may add a product of the pth previous background component B'(p) and the background coefficient α and a product of the pth reference value A(p) and the reference coefficient (1-α) to generate the pth adjustment value C(p), and set the pth background component B(p) as the pth adjustment value C(p). In the reset mode, the background component estimation unit 133 may set the reference coefficient (1-α) to 1 and the background coefficient α to 0, and employ the pth reference value A(p) without using the pth previous background component B'(p) to generate the pth adjustment value C(p). In the fast mode, the background component estimation unit 133 may set the background coefficient α to be less than the reference coefficient (1-α), and employ a larger portion of the pth reference value A(p) and a smaller portion of the pth previous background component B'(p) to generate the pth adjustment value C(p). For example, in the fast mode, the background coefficient α may be 0.1, and the reference coefficient (1-α) may be 0.9. In the slow mode, the background component estimation unit 133 may set the background coefficient α to be greater than the reference coefficient (1-α), and employ a smaller portion of the pth reference value A(p) and a larger portion of the pth previous background component B'(p) to generate the pth adjustment value C(p). For example, in the slow mode, the background coefficient α may be 0.9, and the reference coefficient (1-α) may be 0.1. In the frozen mode, the background component estimation unit 133 may set the reference coefficient (1-α) to 0 and the background coefficient α to 1, and employ the pth previous background component B'(p) without using the pth reference value A(p) to generate the pth adjustment value C(p).

The background component removal unit 134 may generate P sets of envelope data according to the magnitudes |D(1,1)| to |D(M,P)|, e.g., P sets of upper envelope data corresponding to the P frequency bins, and compute P sets of difference data between the P sets of upper envelope data and the P background components B(1) to B(P) corresponding to the P frequency bins, respectively. The pth set of difference data may include M differences, in which an mth difference represents a beat frequency corresponding to the pth frequency bin in the mth time interval after removing the background component B(p). The target detection unit 135 may determine a distance between the target object 140 and the radar 100 according to the P difference data corresponding to the P frequency bins to generate the spatial information of the target object 140, and output the output signal So. The distance between the target object 140 and the radar 100 may be expressed by Equation 2:

$$d = \frac{Tswp}{Bswp} * \frac{fb*c}{2} \qquad \text{Equation 2}$$

where d is the distance between the target object 140 and the radar 100;
Tswp is the sweep interval of the transmission signal St;
Bswp is the sweep bandwidth of the transmission signal St;
  c is the speed of light; and
  fb is the beat frequency.

The target detection unit 135 may compute the distance d between the target object 140 and the radar 100 as the output signal So according to the beat frequency fb, the sweep interval Tswp, the sweep bandwidth Bswp and the speed of light c. The sweep interval Tswp may be the up-chirp interval Tup_swp or the down-chirp interval Tdown_swp.

In some embodiments, the ADC 124, the window function unit 131, the frequency-domain transform unit 132, the background component estimation unit 133, the background component removal unit 134 and the target detection unit 135 may perform signal processing respectively on the up-chirp segment and the down-chirp segment of the echo signal Se to detect the target object 140 and to compute the distance d between the target object 140 and the radar 100.

Figure 3:
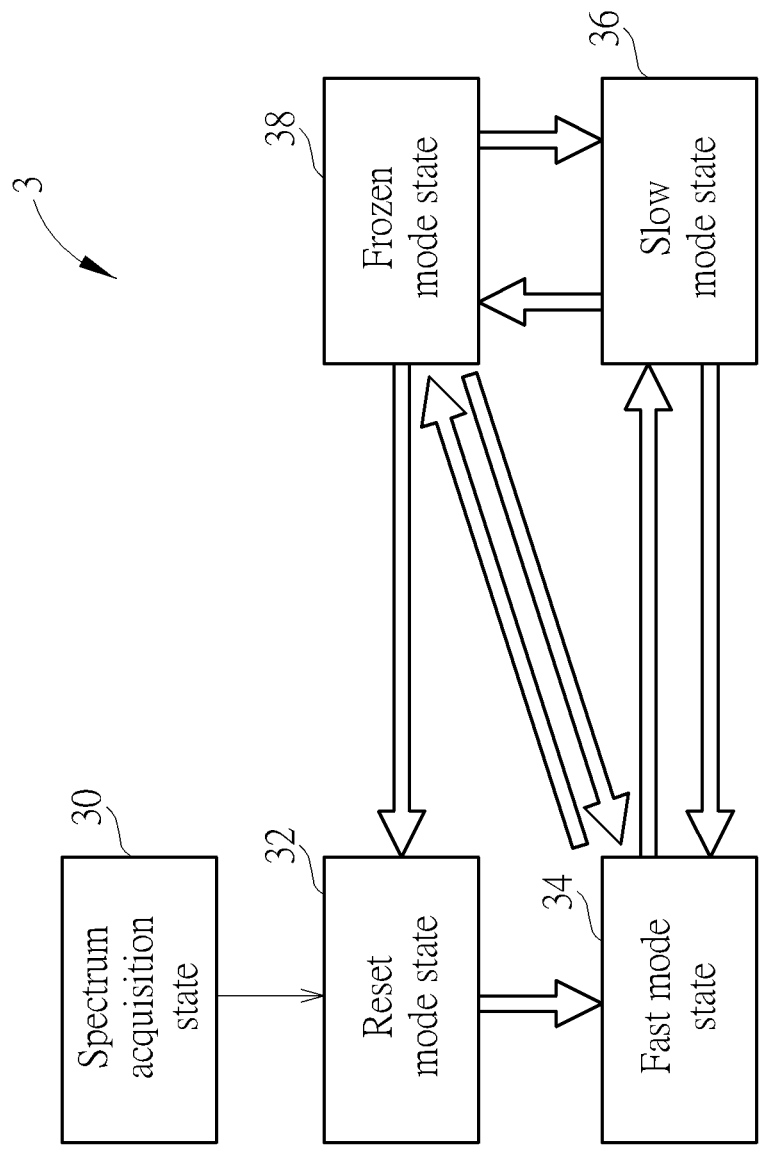
FIG. 3 is a schematic diagram of a background update state machine of the radar in FIG. 1.

FIG. 3 is a schematic diagram of a background update state machine 3 of the radar 100 in FIG. 1, including a spectrum acquisition state 30, a reset mode state 32, a fast mode state 34, a slow mode state 36 and a frozen mode state 38. The radar 100 may acquire the frequency components D(1,1) to D(M,P) corresponding to the P frequency bins in the M time intervals, and switch between the reset mode state 32, the fast mode state 34, the slow mode state 36 and the frozen mode state 38 according to the frequency components D(1,1) to D(M,P). The switching criteria of the state machine 3 will be detailed in the following paragraphs.

Figure 4:
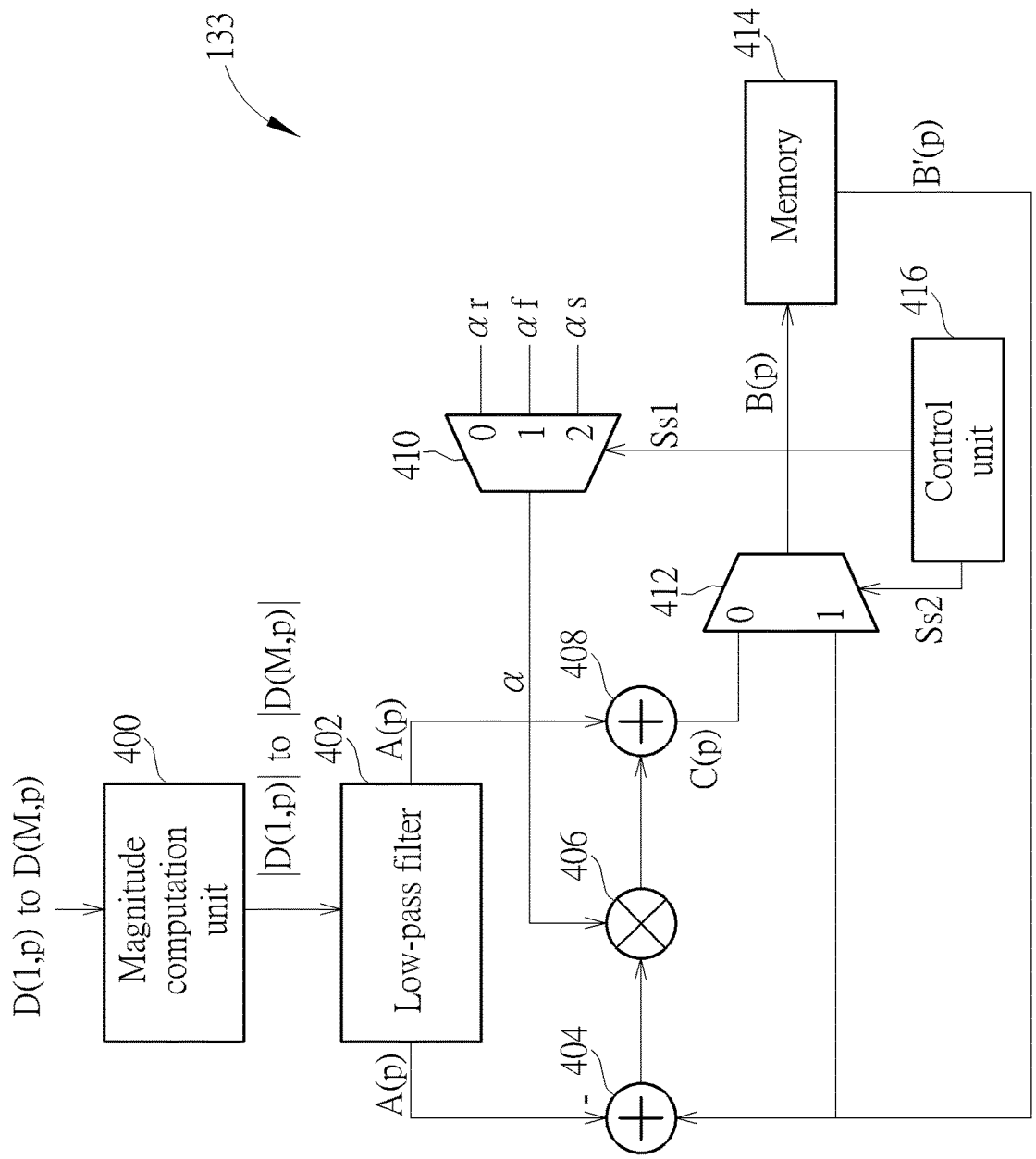
FIG. 4 is a block diagram of the background component estimation unit in FIG. 1.

FIG. 4 is a block diagram of the background component estimation unit 133, including a magnitude computation unit 400, a low-pass filter 402, adders 404, 408, a multiplier 406, multiplexers 410, 412, a memory 414 and a control unit 416. The magnitude computation unit 400 may be coupled to the low-pass filter 402. The low-pass filter 402 may be coupled to the adder 404 and the adder 408. The adder 404 and the multiplexer 410 may be coupled to the multiplier 406. The multiplier 406 may be coupled to the adder 408. The adder 408 and the memory 414 may be coupled to the multiplexer 412. The memory 414 may be coupled to the adder 404. The control unit 416 may be coupled to the multiplexer 410 and the multiplexer 412. The magnitude computation unit 400, the low-pass filter 402 and the control unit 416 may be implemented by software, hardware or a combination thereof.

The magnitude computation unit 400 may receive the frequency components D(1,p) to D(M,p) corresponding to the pth frequency bin in the M time intervals to compute the magnitudes |D(1,p)| to |D(M,p)| thereof. The low-pass filter 402 may compute the mean of the magnitudes |D(1,p)| to |D(M,p)| as the pth reference value A(p), and output the pth reference value A(p) to the adder 404 and the adder 408. The control unit 416 may determine an operation mode of the background component estimation unit 133, and output selection signals Ss1, Ss2 to the multiplexers 410, 412 according to the operation mode of the background component estimation unit 133. The multiplexer 410 may select the background coefficient α for use in the reset mode, the fast mode and the slow mode according to the selection signal Ss1. The selection signal Ss1 may select the background coefficient α for one of the reset mode, the fast mode and the slow mode. For example, when the selection signal Ss1 is 0, the multiplexer 410 may select a reset mode coefficient αr as the background coefficient α of the reset mode; when the selection signal Ss1 is 1, the multiplexer 410 may select a fast mode coefficient αf as the background coefficient α of the fast mode; and when the selection signal Ss1 is 2, the multiplexer 410 may select a slow mode coefficient αs as the background coefficient α of the slow mode. The reset mode coefficient αr may be 0, the fast mode coefficient αf may be 0.1, and the slow mode coefficient αs may be 0.9. The multiplexer 412 may select the frozen mode or other operation modes according to the selection signal Ss2 to generate the pth background component B(p). The selection signal Ss2 may select one of the pth previous background component B'(p) and the pth adjustment value C(p). For example, when the selection signal Ss2 is 0, the multiplexer 412 may select the pth adjustment value C(p) as the pth background component B(p); and when the selection signal Ss2 is 1, the multiplexer 412 may select the pth previous background component B'(p) as the pth background component B(p). The memory 414 may store the pth background component B(p) and output the pth previous background component B'(p) to the adder 404. The adder 404 may subtract the pth reference value A(p) from the pth previous background component B'(p) to generate a first addition result B'(p)-A(p), the multiplier 406 may multiply the first addition result B'(p)-A(p) by the background coefficient $\alpha$ to generate a product (B'(p)-A(p))$\alpha$, and the adder 408 may add the product (B'(p)-A(p))$\alpha$ and the pth reference value A(p) to generate the pth adjustment value C(p).

Figure 5:
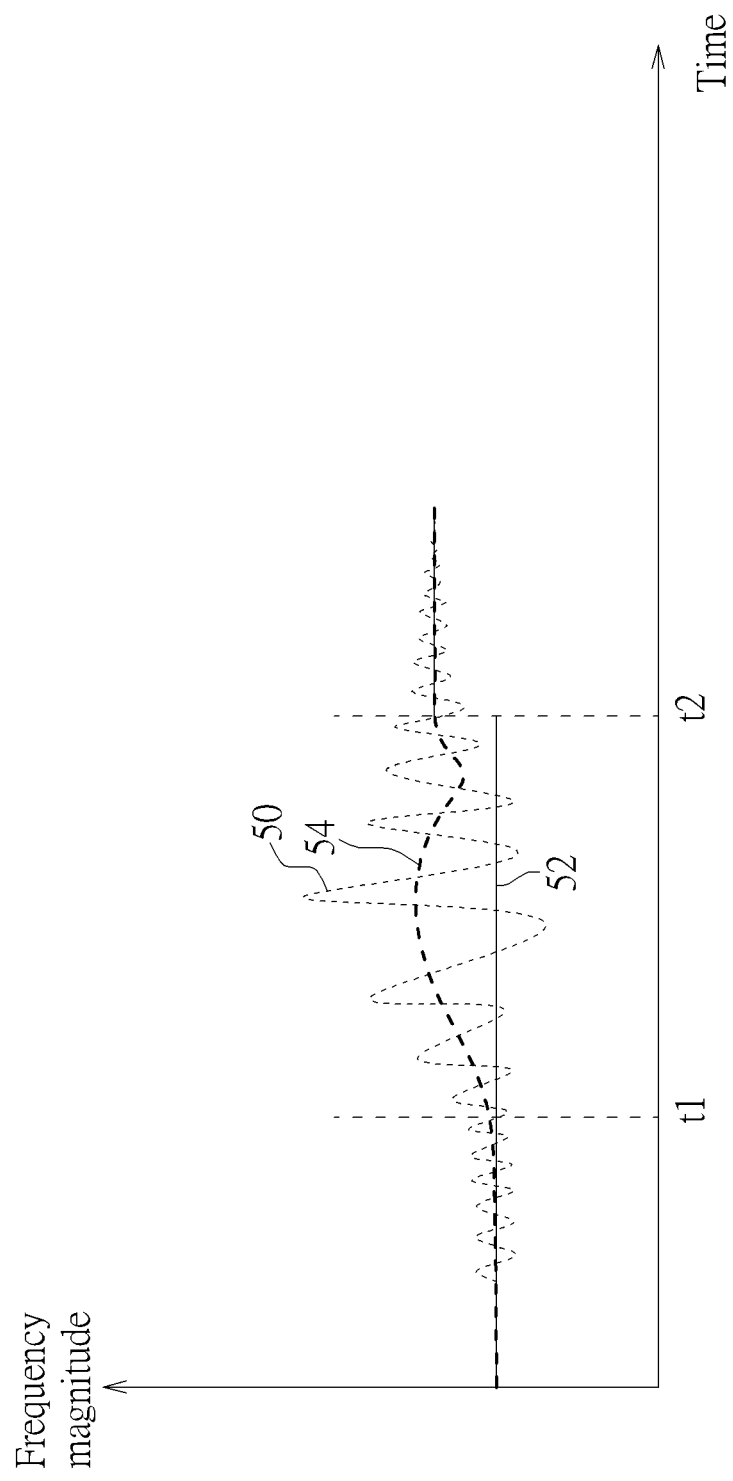
FIGS. 5 to 7 show waveforms of the pth frequency bin of the background component estimation unit in FIG. 1 operating in the reset mode, the frozen mode, the slow mode and the fast mode, respectively.

When the control unit 416 determines that the operation mode of the background component estimation unit 133 is the reset mode, the control unit 416 may set both the selection signals Ss1, Ss2 to 0. If the reset mode coefficient $\alpha$r is 0, the adjustment value C(p) is the pth reference value A(p), and the pth background component B(p) is the pth adjustment value C(p), or equivalently, the pth reference value A(p). In some embodiments, in an initialization period of the radar 100, the control unit 416 may determine that the operation mode of the background component estimation unit 133 is the reset mode. The initialization period may be a predetermined set of time intervals, such as 32 time intervals. In other embodiments, the control unit 416 may compute the pth variance of the magnitudes |D(1,p)| to |D(M,p)| corresponding to the pth frequency bin in the M time intervals, and when a difference between the pth reference value A(p) and the previous background component B'(p) exceeds a first threshold and the pth variance is less than a second threshold, the reset mode may be used to generate the pth adjustment value C(p), thereby updating the pth background component B(p). FIG. 5 shows a waveform of the pth frequency bin in the reset mode, in which the horizontal axis represents time and the vertical axis represents frequency magnitude. FIG. 5 includes a pth frequency bin signal 50, a base line 52 and a reference line 54. The base line 52 may be formed by connecting all the pth background components B(p) in the M time intervals, and the reference line 54 may be formed by connecting all the pth reference values A(p) in the M time intervals. After Time t2, since the difference between the pth reference value A(p) and the pth previous background component B'(p) is large and the pth variance of the pth frequency bin is small, the background component estimation unit 133 may adopt the reset mode to directly update the pth background component B(p) to be the pth reference value A(p), in order to quickly update the pth background component B(p).

When the control unit 416 determines that the operation mode of the background component estimation unit 133 is the frozen mode, the control unit 416 may output the selection signal Ss2 of 1 to set the pth previous background component B'(p) as the pth background component B(p). In some embodiments, the control unit 416 may compute the pth variance corresponding to the magnitudes |D(1,p)| to |D(M,p)| corresponding to the pth frequency bin in the M time intervals, and when the difference between the pth reference value A(p) and the pth previous background component B'(p) exceeds the first threshold and the pth variance exceeds the second threshold, the frozen mode may be used to update the pth background component B(p). FIG. 5 also shows a waveform of the pth frequency bin in the frozen mode. Between Time t1 and Time t2, since the difference between the pth reference value A(p) and the pth previous background component B'(p) is large and the pth variance of the pth frequency bin is also large, the target object 140 may be present at a location corresponding to the pth frequency bin, and the background component estimation unit 133 may adopt the frozen mode to freeze the pth background component B(p) at the pth previous background component B'(p), so as to generate the pth background component B(p) without being affected by the target object 140.

Figure 6:
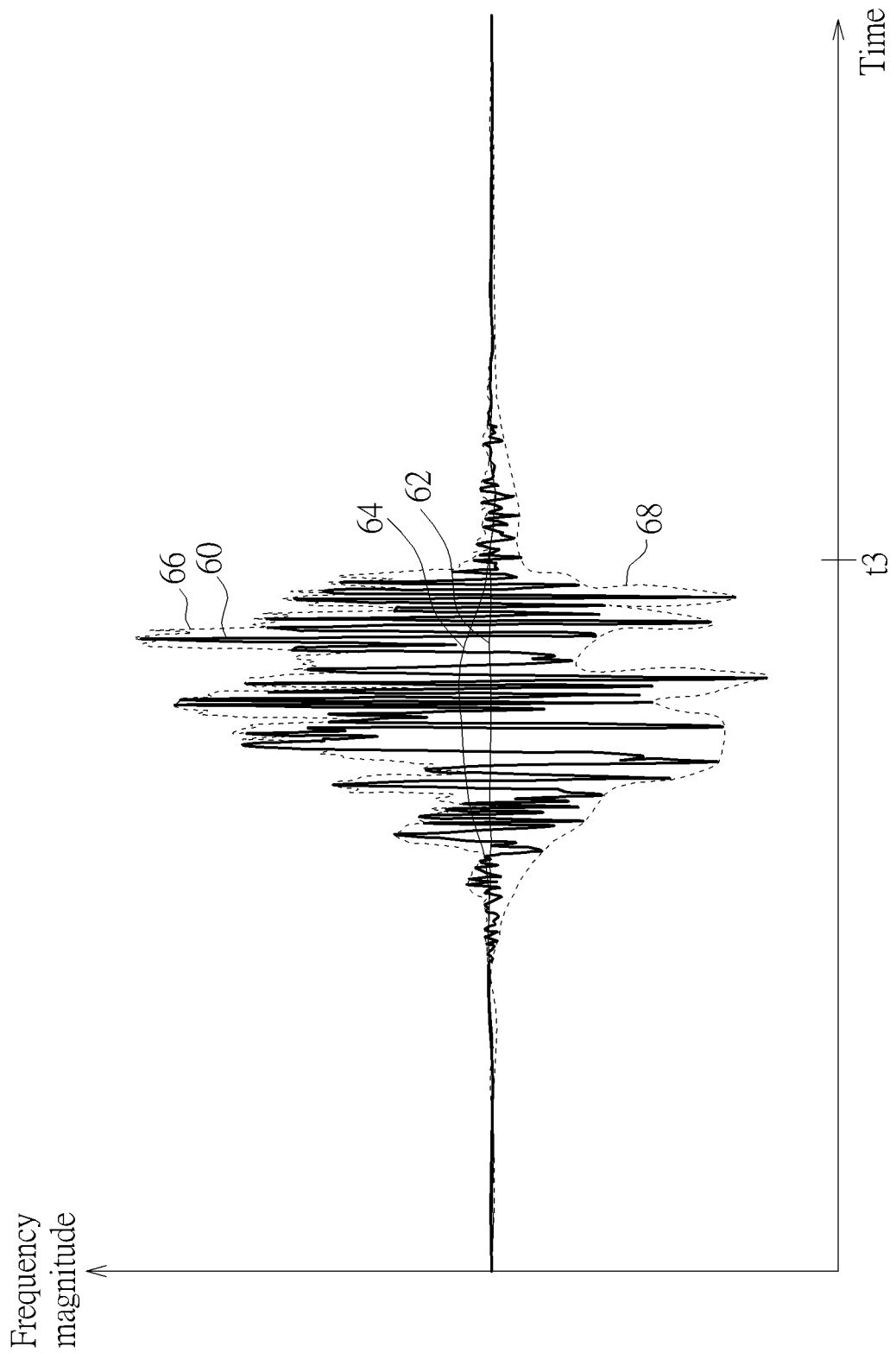

When the control unit 416 determines that the operation mode of the background component estimation unit 133 is the slow mode, the control unit 416 may output the selection signal Ss1 of 2 to set the background coefficient $\alpha$ to be greater than the reference coefficient (1-$\alpha$), so as to set a linear combination of the pth reference value A(p) and the pth previous background component B'(p) as the pth adjustment value C(p), and output the selection signal Ss2 of 0 to set the pth adjustment value C(p) as the pth background component B(p). In some embodiments, the control unit 416 may compute the pth variance of the magnitudes |D(1,p)| to |D(M,p)| corresponding to the pth frequency bin in the M time intervals, and when the difference between the pth reference value A(p) and the pth previous background component B'(p) is less than the first threshold and the pth variance is less than the second threshold, the slow mode may be used to compute the pth adjustment value C(p), thereby updating the pth background component B(p). FIG. 6 shows a waveform of the pth frequency bin in the slow mode, in which the horizontal axis represents time and the vertical axis represents frequency magnitude. FIG. 6 includes a pth frequency bin signal 60, a base line 62, a reference line 64, an upper envelope line 66 and a lower envelope line 68. The base line 62 may be formed by connecting all the pth background components B(p) in the M time intervals, and the reference line 64 may be formed by connecting all the pth reference values A(p) in the M time intervals. After Time t3, since the difference between the pth reference value A(p) and the pth previous background component B'(p) is small and the pth variance of the pth frequency bin is also small, the background component estimation unit 133 may adopt the slow mode to employ a linear combination of the pth previous background component B'(p) and the pth reference value A(p) as the pth adjustment value C(p), thereby gradually updating the pth background component B(p). In some embodiments, when the difference between the pth reference value A(p) and the pth previous background component B'(p) is less than the first threshold and the pth variance is less than the second threshold, the control unit 416 may output the selection signals Ss1, Ss2 to set the operation mode of the background component estimation unit 133 as the fast mode, the frozen mode, or the reset mode. Since the difference between the pth reference value A(p) and the pth previous background component B'(p) is small, the background component estimation unit 133 may adopt any one of the fast mode, the frozen mode and the reset mode as the operation mode to update the pth background component B(p).

Figure 7:
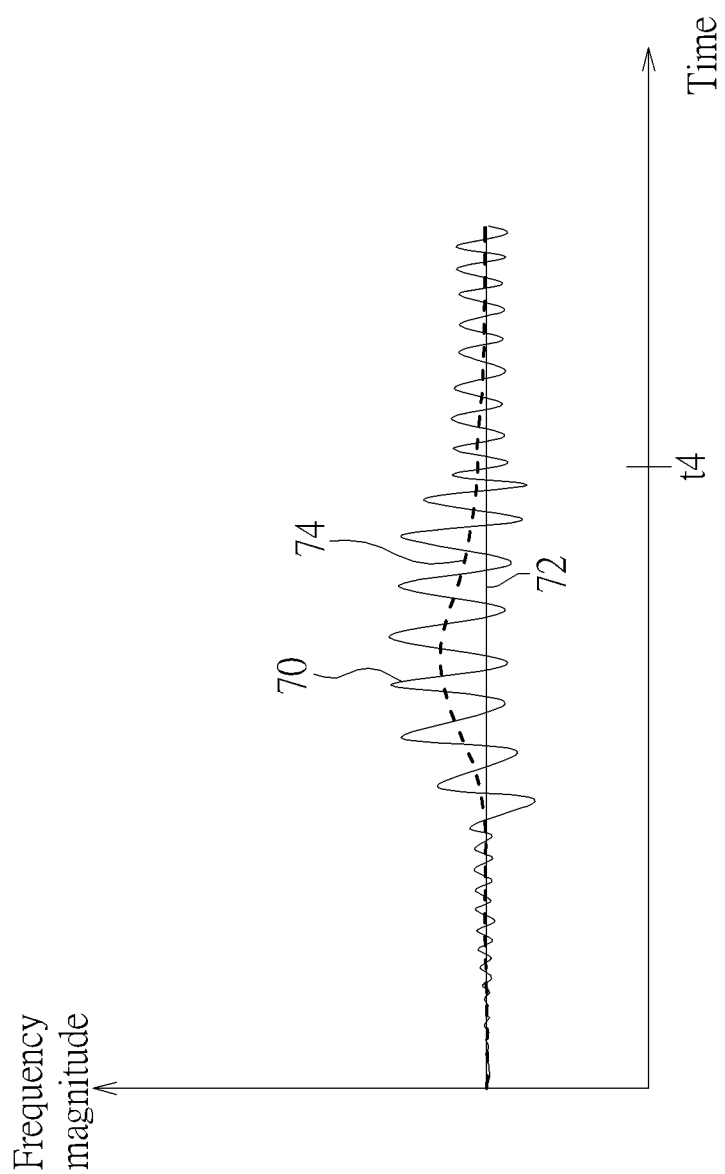

When the control unit 416 determines that the operation mode of the background component estimation unit 133 is the fast mode, the control unit 416 may output the selection signal Ss1 of 1 to set the background coefficient $\alpha$ to be less than the reference coefficient (1-$\alpha$), so as to set a linear combination of the pth reference value A(p) and the pth previous background component B'(p) as the pth adjustment value C(p), and output the selection signal Ss2 of 0 to set the pth adjustment value C(p) as the pth background component B(p). In some embodiments, the control unit 416 may compute the pth variance of the magnitudes |D(1,p)| to |D(M,p)| corresponding to the pth frequency bin in the M time intervals, and when the difference between the pth reference value A(p) and the pth previous background component B'(p) is less than the first threshold and the pth variance exceeds the second threshold, the fast mode may be used to compute the pth adjustment value C(p), thereby updating the pth background component B(p). FIG. 7 shows a waveform of the pth frequency bin in the fast mode, in which the horizontal axis represents time and the vertical axis represents frequency magnitude. FIG. 7 includes a pth frequency bin signal 70, a base line 72 and a reference line 74. The base line 72 may be formed by connecting all the pth background components B(p) in the M time intervals, and the reference line 74 may be formed by connecting all the pth reference values A(p) in the M time intervals. After Time t4, since the difference between the pth reference value A(p) and the pth previous background component B'(p) is small and the pth variance of the pth frequency bin is large, the background component estimation unit 133 may adopt the fast mode to employ a linear combination of the pth previous background component B'(p) and the pth reference value A(p) as the pth adjustment value C(p), thereby quickly updating the pth background component B(p).

Figure 8:
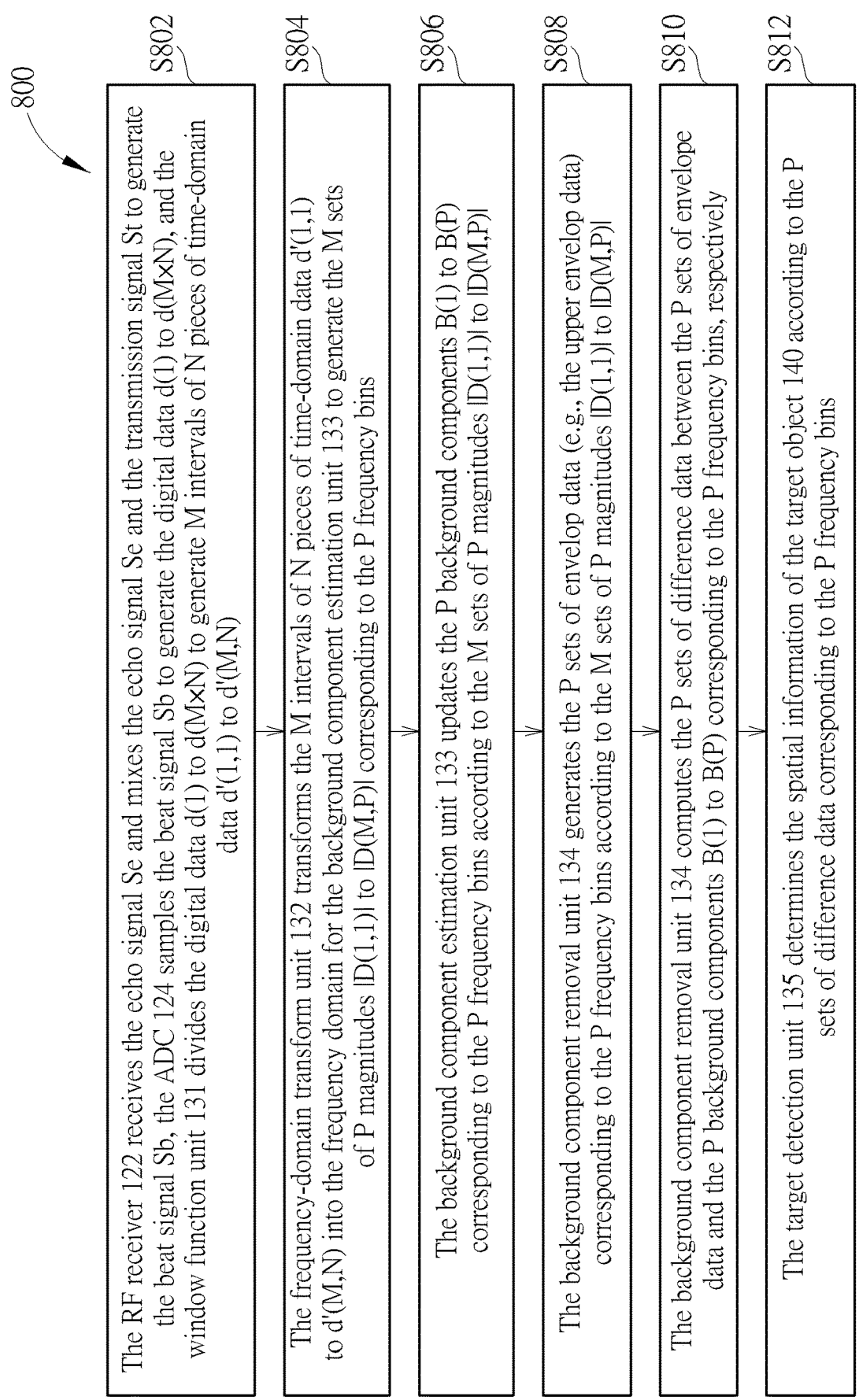
FIG. 8 is a flowchart of a method of updating background components in a radar echo signal according to an embodiment of the invention.

FIG. 8 is a flowchart of a method 800 of updating background components in a radar echo signal according to an embodiment of the invention, adopted by the radar 100 to detect the target object 140. The method 800 includes Steps S802 to S812. Step S802 is used to process the echo signal Se to generate M intervals of N pieces of time-domain data. Steps S804 and S806 are used to update the P background components corresponding to the P frequency bins. Steps S808 and S810 are used to remove the P background components corresponding to the P frequency bins. Step S812 is used to generate the spatial information of the target object 140. Any reasonable technological change or step adjustment is within the scope of the disclosure. Steps S802 to S812 are exemplified using the radar 100 as follows:

Step S802: The RF receiver 122 receives the echo signal Se and mixes the echo signal Se and the transmission signal St to generate the beat signal Sb, the ADC 124 samples the beat signal Sb to generate the digital data d(1) to d(M×N), and the window function unit 131 divides the digital data d(1) to d(M×N) to generate M intervals of N pieces of time-domain data d'(1,1) to d'(M,N);

Step S804: The frequency-domain transform unit 132 transforms the M intervals of N pieces of time-domain data d'(1,1) to d'(M,N) into the frequency domain for the background component estimation unit 133 to generate the M sets of P magnitudes |D(1,1)| to |D(M,P)| corresponding to the P frequency bins;

Step S806: The background component estimation unit 133 updates the P background components B(1) to B(P) corresponding to the P frequency bins according to the M sets of P magnitudes |D(1,1)| to |D(M,P)|;

Step S808: The background component removal unit 134 generates the P sets of envelop data (e.g., the upper envelop data) corresponding to the P frequency bins according to the M sets of P magnitudes |D(1,1)| to |D(M,P)|;

Step S810: The background component removal unit 134 computes the P sets of difference data between the P sets of envelope data and the P background components B(1) to B(P) corresponding to the P frequency bins, respectively;

Step S812: The target detection unit 135 determines the spatial information of the target object 140 according to the P sets of difference data corresponding to the P frequency bins.

Explanations for Steps S802 to S812 have been provided in the preceding paragraphs and will not be repeated here.

Figure 9:
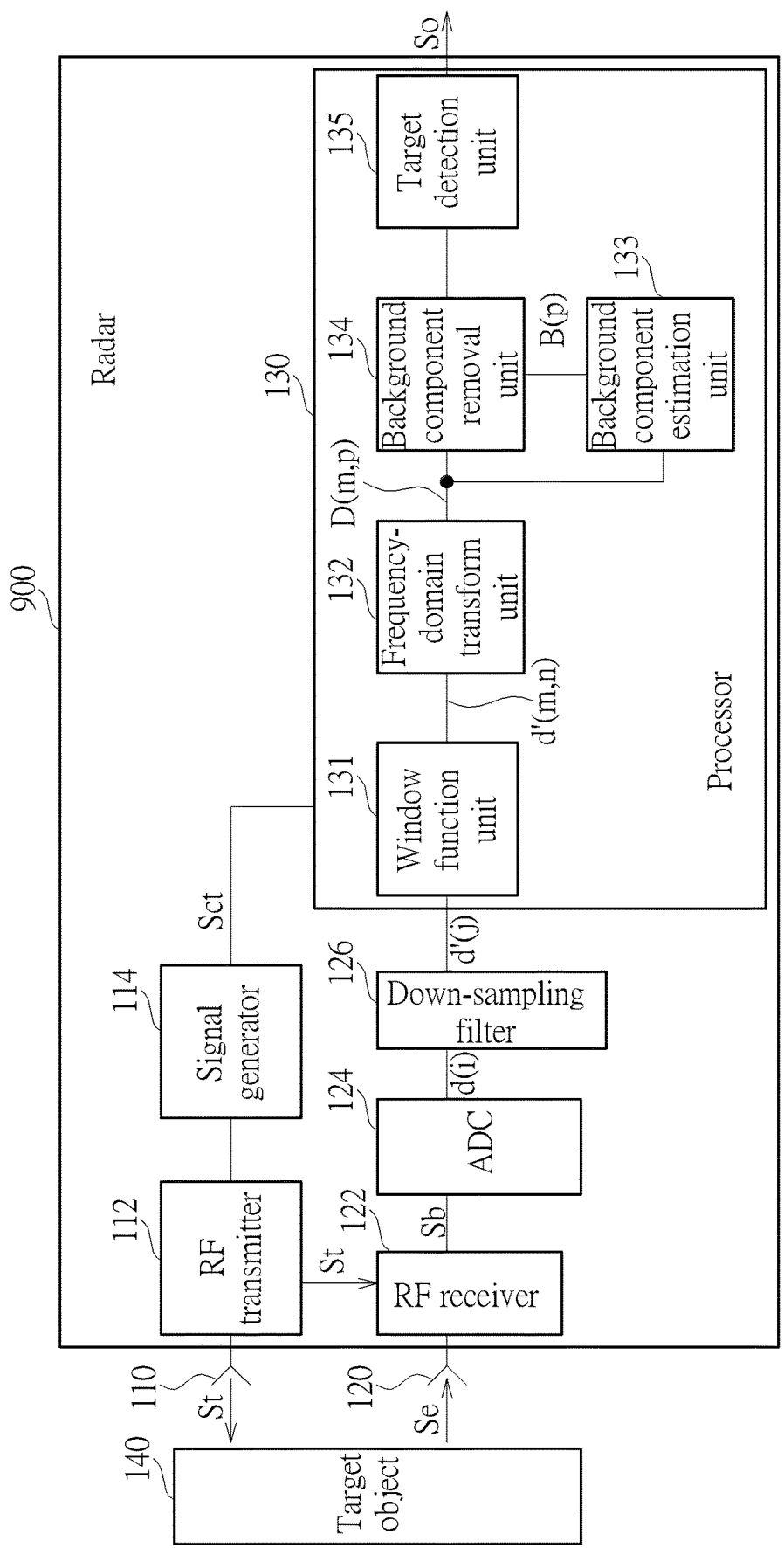
FIG. 9 is a block diagram of a radar according to another embodiment of the invention.

FIG. 9 is a block diagram of a radar 900 according to another embodiment of the invention. The configuration and operation of the radar 900 are similar to those of the radar 100, the main difference lies in that the radar 900 further includes a down-sampling filter 126 which could be configured internally or externally to the processor 130. Explanations for the down-sampling filter 126 are provided as follows: The down-sampling filter 126 may be coupled between the ADC 124 and the processor 130, receive the digital data d(i), and perform down-sampling on the digital data d(i) by a predetermined factor to generate down-sampled data d'(j), wherein j is a positive integer exceeding 1 and j<i. For example, the down-sampling filter 126 may down-sample the digital data d(i) by a factor of 80 to generate the down-sampled data d'(j). The processor 130 may use the down-sampled data d'(j) to estimate and remove the background component corresponding to each frequency bin, thereby accurately estimating the spatial information of the target object 140.

The radars 100, 900 and the method 800 may estimate in real time a background component in each frequency bin, and remove the background component in each frequency bin from the echo signal Se to accurately estimate the spatial information of the target object 140.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of updating background components in an echo signal of a radar, the radar being a frequency-modulated continuous wave radar and comprising an antenna, the method comprising:

the antenna receiving the echo signal;
generating digital data according to the echo signal;
generating M sets of N pieces of time-domain data in M respective time intervals from the digital data;
transforming the M sets of N pieces of time-domain data to a frequency domain to generate M sets of P magnitudes corresponding to P frequency bins, wherein the M sets of N pieces of time-domain data comprise spatial information of an object;
computing a pth reference value of M sets of magnitudes corresponding to a pth frequency bin of the P frequency bins;
computing a pth variance of the M sets of magnitudes corresponding to the pth frequency bin of the P frequency bins;
when a difference between the pth reference value corresponding to the pth frequency bin and the pth previous background component corresponding to the pth frequency bin exceeds a first threshold value and the pth variance corresponding to the pth frequency bin is less than a second threshold, using a reset mode as an operation mode;
when the difference between the pth reference value corresponding to the pth frequency bin and the pth previous background component corresponding to the pth frequency bin exceeds the first threshold value and the pth variance corresponding to the pth frequency bin exceeds the second threshold, using a frozen mode as the operation mode;

when the difference between the pth reference value corresponding to the pth frequency bin and the pth previous background component corresponding to the pth frequency bin is less than the first threshold value and the pth variance corresponding to the pth frequency bin is less than the second threshold, using a slow mode as the operation mode;

when the difference between the pth reference value corresponding to the pth frequency bin and the pth previous background component corresponding to the pth frequency bin is less than the first threshold value and the pth variance corresponding to the pth frequency bin exceeds the second threshold, using a fast mode as the operation mode; and computing a weighted sum of the pth reference value and the pth previous background component corresponding to the operation mode to generate an adjustment value to update a pth background component of the P background components;

wherein M, N and P are positive integers exceeding 1, and p is a positive integer ranging between 1 and P inclusive.

2. The method of claim 1, further comprising:

generating P sets of envelope data corresponding to the P frequency bins according to the M sets of P magnitudes corresponding to the P frequency bins;

computing P sets of difference data between the P sets of envelope data and P background components, the P sets of difference data corresponding to the P frequency bins, respectively; and determining the spatial information of the object according to the P sets of difference data corresponding to the P frequency bins.

3. The method of claim 1, wherein computing the weighted sum of the pth reference value and the pth previous background component corresponding to the operation mode to generate the adjustment value comprises:

setting a reference coefficient of the pth reference value to 0 and a background coefficient of the pth previous background component to 1 to generate the adjustment value in the frozen mode.

4. The method of claim 1, wherein computing the weighted sum of the pth reference value and the pth previous background component corresponding to the operation mode to generate the adjustment value comprises:

in the slow mode, setting a background coefficient of the pth previous background component to be greater than a reference coefficient of the pth reference value; and adding a product of the pth previous background component and the background coefficient and a product of the pth reference value and the reference coefficient to generate the adjustment value.

5. The method of claim 1, wherein computing the weighted sum of the pth reference value and the pth previous background component corresponding to the operation mode to generate the adjustment value comprises:

in the fast mode, setting a background coefficient of the pth previous background component to be less than a reference coefficient of the pth reference value; and adding a product of the pth previous background component and the background coefficient and a product of the pth reference value and the reference coefficient to generate the adjustment value.

6. The method of claim 1, wherein computing the pth variance of the M sets of magnitudes corresponding to the pth frequency bin of the P frequency bins comprises:

computing a pth set of upper envelope data and a pth set of lower envelope data corresponding to the pth frequency bin of the P frequency bins; and computing differences between the pth set of upper envelope data and the pth set of lower envelope data to generate the pth variance.

7. The method of claim 1, wherein computing the weighted sum of the pth reference value and the pth previous background component corresponding to the operation mode to generate the adjustment value comprises:

setting a reference coefficient of the pth reference value to 1 and a background coefficient of the pth previous background component to 0 to generate the adjustment value in the reset mode.

8. The method of claim 7, further comprising:

using the reset mode to compute the adjustment value during an initialization period of the radar.

9. A frequency-modulated continuous wave (FMCW) radar comprising:

an antenna configured to receive an echo signal; and a processor coupled to the antenna and configured to generate M sets of N pieces of time-domain data in M respective time intervals from digital data, transform the M sets of N pieces of time-domain data to frequency domain to generate M sets of P magnitudes corresponding to P frequency bins, compute a pth reference value of M sets of magnitudes corresponding to a pth frequency bin of the P frequency bins, compute a pth variance of the M sets of magnitudes corresponding to the pth frequency bin of the P frequency bins, use a reset mode as an operation mode when a difference between the pth reference value corresponding to the pth frequency bin and the pth previous background component corresponding to the pth frequency bin exceeds a first threshold value and the pth variance corresponding to the pth frequency bin is less than a second threshold, use a frozen mode as the operation mode when the difference between the pth reference value corresponding to the pth frequency bin and the pth previous background component corresponding to the pth frequency bin exceeds the first threshold value and the pth variance corresponding to the pth frequency bin exceeds the second threshold, use a slow mode as the operation mode when the difference between the pth reference value corresponding to the pth frequency bin and the pth previous background component corresponding to the pth frequency bin is less than the first threshold value and the pth variance corresponding to the pth frequency bin is less than the second threshold, use a fast mode as the operation mode when the difference between the pth reference value corresponding to the pth frequency bin and the pth previous background component corresponding to the pth frequency bin is less than the first threshold value and the pth variance corresponding to the pth frequency bin exceeds the second threshold, and compute a weighted sum of the pth reference value and the pth previous background component corresponding to the operation mode to generate an adjustment value, so as to update a pth background component of the P background components;

wherein the M sets of N pieces of time-domain data comprise spatial information of an object;

wherein M, N and P are positive integers exceeding 1, and p is a positive integer ranging between 1 and P inclusive.

10. The FMCW radar of claim 9, wherein the processor is further configured to:
generate P sets of envelope data corresponding to the P frequency bins according to the M sets of P magnitudes corresponding to the P frequency bins;
compute P sets of difference data between the P sets of envelope data and P background components, the P sets of difference data corresponding to the P frequency bins, respectively; and
determine the spatial information of the object according to the P sets of difference data corresponding to the P frequency bins.

11. The FMCW radar of claim 9, wherein the processor is configured to:
set a reference coefficient of the pth reference value to 0 and a background coefficient of the pth previous background component to generate the adjustment value in the frozen mode.

12. The FMCW radar of claim 9, wherein the processor is configured to:
set a background coefficient of the pth previous background component to be greater than a reference coefficient of the pth reference value in the slow mode; and
add a product of the pth previous background component and the background coefficient and a product of the pth reference value and the reference coefficient to generate the adjustment value.

13. The FMCW radar of claim 9, wherein the processor is configured to:
set a background coefficient of the pth previous background component to be less than a reference coefficient of the pth reference value in the fast mode; and
add a product of the pth previous background component and the background coefficient and a product of the pth reference value and the reference coefficient to generate the adjustment value.

14. The FMCW radar of claim 9, wherein the processor is configured to set a reference coefficient of the pth reference value to 1 and a background coefficient of the pth previous background component to 0 to generate the adjustment value in the reset mode.

* * * * *